Dec. 8, 1964  A. MONTANI  3,160,504
AUTOMATIC DODGING OF PHOTOGRAPHS
Filed Jan. 17, 1963
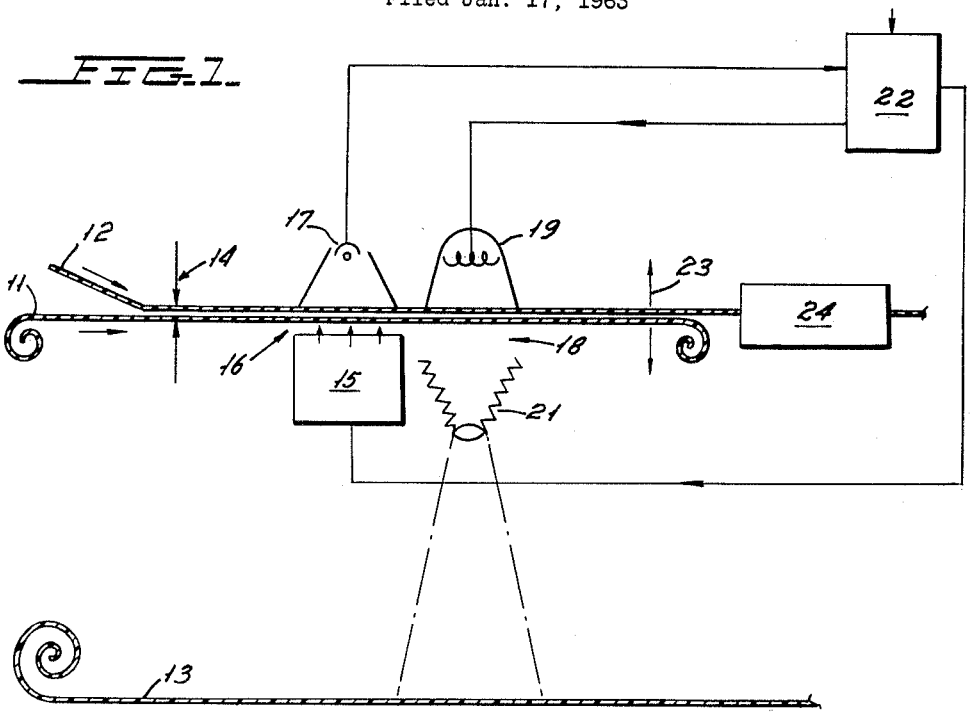
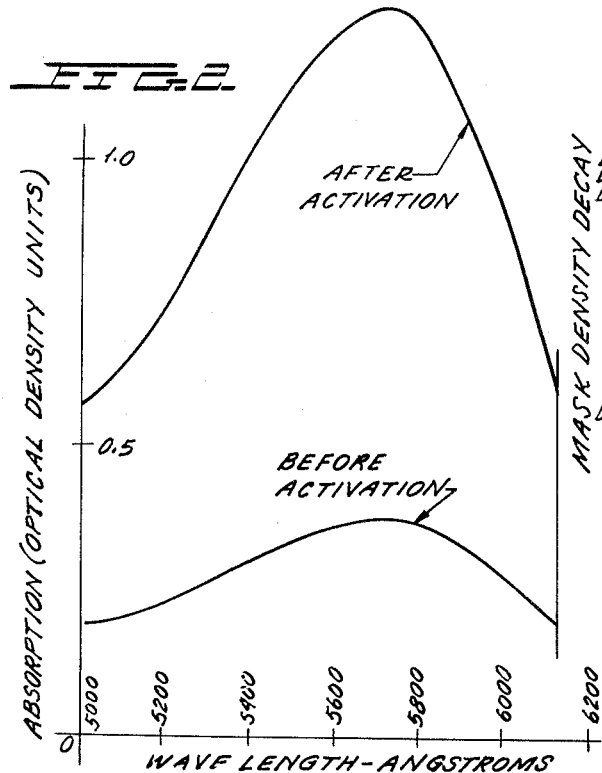
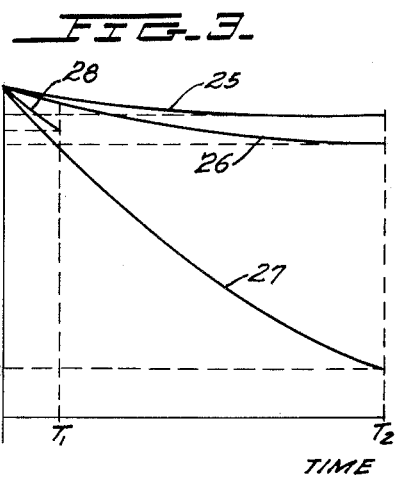
INVENTOR.
ANGELO MONTANI
BY

United States Patent Office 3,160,504
Patented Dec. 8, 1964

3,160,504
AUTOMATIC DODGING OF PHOTOGRAPHS
Angelo Montani, Great Neck, N.Y., assignor to Sperry Rand Corporation, Ford Instrument Company Division, Long Island City, N.Y., a corporation of Delaware
Filed Jan. 17, 1963, Ser. No. 252,075
10 Claims. (Cl. 96—27)

This invention relates to a method for photographic dodging. More particularly the invention pertains to a dodging method for converting a photographic image having low, medium and high density areas into a corrected reversal image possessing decreased density variations, which method may be utilized to sequentially produce a plurality of corrected reversal images from the same original image.

It is often desired in photographic processing to decrease the density variations of a photographic image, e.g., a negative, when producing therefrom the corresponding reversal image, e.g., a positive, in order to facilitate the interpretation of detail information which is not readily seen on the negative due to the character of density variations thereof. Hence, in the early stages of the development of the photographic art it became customary for the technician to interpose opaque cutouts between the light source employed and the low density areas of a negative to be reversed during the printing or enlarging process thereof, thereby selectively reducing the duration of exposure of the light-sensitive layer to be exposed in registration with such low density areas. By suitably locating such cutouts those areas of the photosensitive layer in registration with the low density areas of the negative were exposed to the light source for shorter periods of time, thereby decreasing the contrast variations between the areas of the resulting positive image. Since such procedure "dodges" some of the printing light, it has become commonly known as "dodging."

Such manual procedure is, however, inaccurate and unreliable to say the least, since the technician cannot accurately duplicate the low density areas of the image to be dodged nor predict the duration of time that the cutouts should be interposed to produce the optimum dodging effect. Accordingly, procedures have been devised to provide more accurate dodging effects.

One such correction procedure is disclosed in Yule Patents 2,420,636 and 2,455,849, which disclose an unsharp masking procedure involving printing an underexposed positive image from an original negative, processing the resulting diapositive and superposing the same in registration with the negative during contact printing or enlarging to produce the desired corrected positive. Obviously, such a dodging procedure is laborious and time consuming; moreover it is difficult to secure accurate registration of the original negative and the processed diapositive mask due to the uneven shrinkage of the base film of the latter upon drying after processing. Accordingly such masking procedure is rarely practiced.

It is also known to effect automatic dodging of photographic negatives by employing an electronic scanning procedure utilizing a flying spot cathode ray tube, an amplifier and a photomultiplier device. Upon scanning, the light passing through the negative is sensed and the resulting signal, after amplification, is utilized to vary the brightness of the flying spot, which is utilized to expose the photosensitive material through the negative. This electronic modification of the exposure light thereby decreases the density variations of the resulting positive. However, since the exposure is achieved employing only the moderate amount of light produced by the flying spot scanner the printing time required to produce adequate densities for printing of a positive image is excessive, whether seeking to produce the positive by contact or projection printing. Moreover, such device is extremely expensive and requires skilled maintenance and careful handling.

It has recently been proposed to dodge a photographic negative by exposing a photochromic layer to light of one wave length through the negative to produce a masking image thereof and by thereafter exposing the superposed negative and masking image thus formed to light of another wave length to produce a corrected positive. Such photochromic layers include photochromic materials, i.e., substances whose spectral absorption characteristics may be reversibly changed upon exposure to light having a particular range of wave lengths, supported by suitable transparent substrates, e.g., acetate films.

While the use of photochromic materials for dodging is relatively simple and provides good correction of negative images, it has been found that, upon conventional exposure of the superposed negative and masking images to produce a corrected positive, a relatively high degree of deterioration or decay of the masking image in the photochromic layer occurs, thereby interfering with production of the desired corrected positive. Repeated exposures of the superposed images frequently reduce the density of the masking image to the point at which adequate dodging effects are no longer obtained. Accordingly, it has been necessary, in order to produce a plurality of corrected positives from a single negative image, to bleach out the residual masking image and then re-expose the photochromic layer to the negative image to re-activate or re-form the masking image therein, prior to re-exposing the superposed negative and masking images for the printing of the several positives.

It is among the objects of the present invention to provide a relatively simple and yet effective method of photographic dodging utilizing masking images formed in photochromic layers, which method may be utilized to produce corrected reversal images whose density variations are reduced relative to the density variations of the original image.

A further object of the invention is to provide such a method in which the masking images formed in the photochromic layers are relatively stable and in which such a masking image may be utilized to produce a plurality of reversal images from the same original image, without necessitating bleaching and re-activation or re-formation of the masking image in the photochromic layer.

Other objects and advantages of this invention will be apparent from a consideration of the following detailed description thereof.

In accordance with the invention it has been found possible to repeatedly expose a single photographic image, e.g., a negative, having low, medium and high density areas to convert the same into a plurality of copies of a corrected reversal image, e.g., a positive, possessing decreased density variations, by utilizing a dodging method involving exposing a photochromic layer through such photographic image to form a masking image thereof, exposing a photosensitive layer to actinic light through the superposed photographic image and the masking image thus formed and processing the exposed photosensitive layer to produce the desired reversal image, when the exposure of the photosensitive layer is carried out utilizing a light source having an intensity of from about $10^3$ to $10^{10}$ lumens for a period of from about 5 to 2,000 microseconds, preferably $10^6$ to $10^8$ lumens for a period of from 40 to 500 microseconds.

Employing the indicated exposure conditions, it has been found that the deterioration or decay of the masking image produced in the photochromic layer is substantially minimized, thereby facilitating the production of a plurality of corrected positives from the same negative image without necessitating bleaching and subsequent re-formation of the masking image. Employing such procedure, at least 5 and frequently from about 6 to 10 corrected positives having adequate densities can be produced from the same uncorrected negative image without necessitating repeated treatments of the masking image in the photochromic layer.

It is believed that the normal exposure to a printing light for from about 10 to 60 seconds, for contact printing, or for from about 30 to 180 seconds, for projection printing, is such as to heat the photochromic layer and produce a substantial decay of the masking image therein, in addition to the inevitable decay of such dye image with time. On the other hand it is postulated that, employing the substantially instantaneous exposure of this invention at a light intensity of from about $10^6$ to $10^8$ lumens for a period of from about 40 to 50 microseconds, such as produced by a flash lamp or strobe light, the masking image is subject only to the decay resulting from the light source plus the minute decay from the ambient temperature. At ambient temperatures the density of the photochromic image decays at an extremely slow rate even though the photochromic image is in complete darkness. When the photochromic image is subjected to visible illumination the rate of decay increases and when subjected to visible light and heat (infrared) the rate of decay is very rapid. Therefore, an ordinary printing light or enlarging light which produces large amounts of heat, during the relatively long exposures which are normally required, increases the temperature of the photochromic image and thereby increases the rate of decay. Hence the decay of the masking image exposed in accordance with the present invention is minute relative to the decay heretofore encountered upon exposure of such an image to an ordinary printing or enlarging light. While the foregoing mechanism has been advanced as a possible explanation of the operation of the present invention, it will of course be understood that the invention is not intended to be limited thereto.

The photochromic layer utilized in the practice of the invention may include any of the well-known photochromic materials incorporated in or on a transparent plastic substrate, e.g., an acetate, polyester or acrylic film. Such materials include any of those disclosed in the article entitled "Phototropism" in Reviews of Pure and Applied Chemistry, volume 11, No. 1 (1961). It is preferred, however, to employ as the photochromic material a spiropyran compound having substituents added thereto to weaken the spiro-carbon-to-oxygen bond, which compound is colorless under normal conditions, attains a colored state when exposed to ultraviolet light having a wave length of from about 3,000 to 4,000 A. and reverts back to the colorless state when bleached by exposure to visible light having a wave length of from about 4,000 to 7,000 A. The addition of heat rays (infrared) will hasten the bleaching effect. Such materials are disclosed, for example, in U.S. Patent 2,953,454 of September 20, 1960; a preferred spiropyran disclosed in said patent and useful in the practice of the method of this invention is 1,3,3-trimethyl-6'-nitro-spiro (2'H-1'-benzopyran-2,2'-indoline). This material, prior to exposure to ultraviolet light, transmits light in the visible spectrum; after exposure to ultraviolet light such photochromic material shows a strong absorption of the visible wave lengths between about 5,000 and 6,000 A., as illustrated in FIGURE 2 discussed hereinafter.

The method of the invention involves initially exposing the photochromic layer in the colorless state to ultraviolet light through the negative image whose density variations are to be reduced. There is thereby formed a colored positive image of the original negative whose density is less than that of the negative and which is superposed with the negative, producing a composite negative image having reduced density differentials. The negative is then dodged by exposing a photosensitive layer containing a gelatinous silver halide emulsion to visible light having an intensity of from about $10^6$ to $10^8$ lumens, for a period of from about 40 to 500 microseconds, through the registered negative and masking images, to produce the corrected positive image. It is then possible to expose further photosensitive layers through the superposed negative and masking images to produce a plurality, e.g., from about 6 to 10, additional corrected positives therefrom, without intermittently exposing the photochromic layer to a source of visible light to bleach out the masking image therein and subsequently re-exposing the photochromic layer through the negative image to ultraviolet light to reactivate or re-form the masking image for sequential use.

For a fuller understanding of the nature of the invention, reference is made to the following detailed description of a device for practicing the present invention, taken in connection with the accompanying drawing in which:

FIGURE 1 is a schematic illustration of the elements of an apparatus for dodging a negative film to produce a series of corrected positive images therefrom;

FIGURE 2 is a graph showing a portion of the spectral absorption characteristics of a preferred photochromic material utilized in accordance with the invention; and FIGURE 3 is a graph illustrating the density decay characteristics of a photochromic material.

Referring now to FIGURE 1, a device is shown by which a film 11 bearing a series of negative images having low, medium and high density areas is dodged, employing a film 12 bearing a continuous photochromic layer, to produce a series of corrected positive images in a photosensitive silver halide emulsion on a continuous web 13.

As shown in the drawing, the negative film 11 and the photochromic film 12 are initially superposed and clamped together at a station 14 in order to insure precise registration of the negative images and the masking images formed in the photochromic layer. It has been found desirable to space the photochromic film 12 a slight distance from the negative film 11, as by employing suitable thicknesses for the supporting substrates for the image layers thereof in order to selectively reduce the contrast of the corrected positive formed on the sensitized web 13. The unsharp masking image produced in the photochromic layer does not contain the minute details of the original negative image and, as a consequence, the dodging effect, while still present for dodging areas having relatively large density variations, is reduced or eliminated with respect to detailed areas differing by only slight density differentials. Accordingly, the areas of the negative image are dodged in direct relation to the magnitudes of the density variations thereof.

The superposed negative film 11 and photochromic layer 12 are passed in front of an ultraviolet light source 15 positioned at an exposure station 16. The ultraviolet source emits ultraviolet radiation having a wave length of from about 3,000 to 4,000 A. which passes through the transparent areas of the negative image on the film 11 and exposes portions of the photochromic layer on film 12. The amount of ultraviolet light transmitted through the photochromic layer, which is of course dependent upon the density of the dye image produced therein, is measured by a photocell 17 which transmits a corresponding signal to a measuring device described hereinbelow.

After the unsharp masking image is produced in the photochromic layer 12 the superposed films are moved to a visible light exposure station 18 at which light from a strobe flash lamp 19 or similar source is transmitted through the superposed negative and masking images and projected by a conventional bellows and lens arrangement 21 upon the photosensitive layer on web 13. The light source 19 emits visible light in the range of from about 4,200 to 6,000 A. which is actinic to the photosensitive emulsion on web 13 and which is absorbed by the image portions of the superposed negative and masking images. If desired, a suitable filter may be interposed between the light source 19 and the photochromic film 12 in order to eliminate those wave lengths which are not absorbed by the masking image on the photochromic layer. In the case of the preferred photochromic material, 1,3,3-trimethyl-6'-nitro-spiro (2'H-1'-benzopyran-2,2' - indoline), a portion of whose absorption spectrum is shown in FIGURE 2 of the drawing, a filter may be interposed which absorbs wave lengths below about 5,000 and above about 6,000 A. but which will pass freely the radiation between such limits. In this manner light having wave lengths with respect to which the image in the photochromic layer is in ineffectual mask is not transmitted to the film 12, and the image portions in the photochromic layer can effectively mask the light incident thereon. The specific range of wave lengths of the visible light impinging upon the superposed negative and photochromic films at the exposure station 18 is therefore chosen in accordance with the properties of the particular photochromic material present in the masking image.

The intensity of the light emitted by the flash lamp 19 and the duration of the exposure thereto may be varied within the indicated ranges by means of a control mechanism schematically illustrated at 22. Such mechanism may comprise a suitable comparator for regulating the relative intensities of the visible light transmitted from flash lamp 19 and the ultraviolet light transmitted by the ultraviolet source 15 as functions of the intensity of the radiation passed through the masking image at the first exposure station 16, measured by the photocell 17, in order to produce optimum exposures for producing the masking image and for projecting the negative and superposed masking images to produce the corrected positive thereof.

The photosensitive web 13 is moved subsequent to each exposure of the superposed negative and masking images on films 11 and 12 in order to produce a number of corrected positives from the single negative image. It has thereby been found possible to produce from about 6 to 10 positives from a single negative image.

The decay rates of the density of the masking image of an illustrative photochromic material are shown in FIGURE 3 as a function of the ambient temperature, illumination and heat. The upper curve 25 represents the decay rate in total darkness at ambient temperatures. The curve 26 represents the decay rate due to visible radiation plus the decay due to ambient temperature. Lower curve 27 shows the rapid decay rate of the density of the photochromic mask under the same visible radiation power as postulated for curve 26 with the addition of heat rays. Curve 28 indicates the decay rate, of the instant invention using flash exposure, due to illumination and the ambient temperature for the time of exposure, $T_1$.

As is readily apparent the rate of decay of the photochromic material under flash exposure is minute in comparison to the rate of decay due to printing or enlarging exposures where the illuminating time is greater. The additional exposure time also gives rise to a heat factor which is substantially lacking in flash exposure. This explanation is believed to account for the fact that the masking image in the photochromic layer may, in the method of this invention, be exposed at least 5 times to produce a like number of corrected positives from a single original negative image, without necessitating bleaching and re-exposure to reactivate the masking image.

The photochromic layer, after effecting the desired number of printing exposures therethrough, is separated from the negative film at station 23 and fed to a bleaching unit 24 whereat the photochromic layer is exposed to visible light and infrared to convert the photochromic material to its colorless state. Upon thus being bleached the photochromic layer may be reconveyed to station 14 for a subsequent exposure in superposition with a subsequent negative image to be corrected.

While, in the preceding specification, the preparation of corrected positives from initial negative images by a projection printing procedure has been described in detail, it will be understood that the present invention is similarly applicable to the printing of corrected negatives from positive transparencies and to contact printing as well as to projection printing. Since these and other changes may be made in carrying out the method without departing from the scope of the invention, it is therefore intended that all matter contained in the above description shall be interpreted as illustrative and not in a limiting sense.

What is claimed is:

1. In a method of converting a photographic image having low, medium and high density areas into a reversal image possessing decreased density variations, involving exposing a photochromic layer through said photographic image to form a masking image thereof, exposing a photosensitive layer to actinic light through said photographic image and said masking image to produce a latent reversal image and processing the photosensitive layer to produce the desired reversal image, the improvement comprising exposing said photosensitive layer to a source of visible light having an intensity of from $10^3$ to $10^{10}$ lumens for a period of from 5 to 2,000 microseconds to produce said latent reversal image without substantially decaying the masking image formed in said photochromic layer, in order to facilitate the production of a plurality of copies of said reversal image by exposing photosensitive layers to said source through said photographic image and said masking image, without necessitating bleaching and re-exposure of said photochromic layer to re-form said masking image.

2. The method as defined in claim 1, in which said masking image is produced by exposing the photochromic layer to ultraviolet light having a wave length of from 3,000 to 4,000 A., and in which said latent reversal image is produced by exposing the photosensitive layer to visible light having a wave length of from 4,000 to 7,000 A.

3. The method as defined in claim 1, in which said photochromic layer includes, as a photochromic material therein, a spiropyran compound having substituents added thereto to weaken the spiro-carbon-to-oxygen bond.

4. The method as defined in claim 3, in which the spiropyran compound is 1,3,3-trimethyl-6'-nitro-spiro (2'H-1'-benzopyran-2,2'-indoline).

5. The method as defined in claim 1, in which said photographic image is spaced from the photochromic layer during exposure thereof, in order to produce an unsharp masking image in said photochromic layer, whereby upon exposure of said photosensitive layer through said masking image and said photographic image, a latent reversal image is produced in which the density variations of the photographic image are decreased in direct proportion with their magnitudes.

6. A method of converting a negative photographic image having low, medium and high density areas into a corrected positive image possessing decreased density variations facilitating improved visibility of detail, which comprises exposing a photochromic layer to ultraviolet light through said negative to produce a diapositive masking image therein, exposing a photosensitive layer through the superposed negative and diapositive masking image to visible light having an intensity of from $10^3$ to $10^{10}$ lumens for a period of from 5 to 2,000 microseconds to produce a latent corrected positive image, processing said latent image to produce the corrected positive, and repeating the last mentioned exposure and processing steps to produce at least one additional corrected positive from said negative image without bleaching and re-exposing said photochromic layer to re-form the diapositive masking image formed therein.

7. The method as defined in claim 6, in which at least 5 photosensitive layers are exposed through the superposed negative and diapositive masking image to form latent corrected positive images of said negative prior to bleaching said masking image and re-exposing the photochromic layer to reproduce said masking image.

8. The method as defined in claim 6, in which the photochromic layer contains a spiropyran compound having substituents added thereto to weaken the spiro-carbon-to-oxygen bond, said compound changing its state of light absorption upon exposure to ultraviolet light.

9. The method as defined in claim 8, in which said spiropyran compound is 1,3,3-trimethyl-6'-nitro-spiro(2'H-1'-benzopyran-2,2'-indoline).

10. The method as defined in claim 6, in which the intensity and duration of each exposure of the photochromic layer to ultraviolet light and the intensity and duration of each exposure of the photosensitive layer to visible light are measured and regulated in order to provide the desired density of the diapositive masking image for producing the corrected positive.

References Cited in the file of this patent

UNITED STATES PATENTS

| | | |
|---|---|---|
| 2,420,636 | Yule | May 13, 1947 |
| 2,455,849 | Yule | Dec. 7, 1948 |
| 2,763,180 | Beck | Sept. 18, 1956 |
| 2,953,454 | Berman | Sept. 20, 1960 |